United States Patent
Iwatani et al.

(10) Patent No.: US 10,006,759 B2
(45) Date of Patent: Jun. 26, 2018

(54) METHOD FOR DETECTING BUTT POSITION OF WELD JOINT, DEVICE FOR DETECTING BUTT POSITION OF WELD JOINT, AND METHOD FOR MANUFACTURING WELD JOINT

(75) Inventors: Shingo Iwatani, Nagoya (JP); Keisuke Uchida, Nagoya (JP); Hideki Tamoto, Toyota (JP); Ryota Horie, Nagoya (JP); Katsunori Suzuki, Hamamatsu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 776 days.

(21) Appl. No.: 14/113,914

(22) PCT Filed: Apr. 28, 2011

(86) PCT No.: PCT/JP2011/060429
§ 371 (c)(1),
(2), (4) Date: Oct. 25, 2013

(87) PCT Pub. No.: WO2012/147199
PCT Pub. Date: Nov. 1, 2012

(65) Prior Publication Data
US 2014/0042126 A1    Feb. 13, 2014

(51) Int. Cl.
| | |
|---|---|
| *B23K 1/00* | (2006.01) |
| *B23K 9/00* | (2006.01) |
| *B23K 26/00* | (2014.01) |
| *B23K 26/02* | (2014.01) |
| *G01B 11/14* | (2006.01) |
| *B23K 31/02* | (2006.01) |
| *B23K 3/00* | (2006.01) |

(Continued)

(52) U.S. Cl.
CPC ............... *G01B 11/14* (2013.01); *B23K 3/00* (2013.01); *B23K 31/02* (2013.01); *G01B 5/0037* (2013.01); *G01B 11/25* (2013.01); *B23K 2201/008* (2013.01); *B23K 2201/06* (2013.01)

(58) Field of Classification Search
CPC .......... B23K 2201/008; B23K 2201/06; B23K 31/02; B23K 3/00; G01B 11/14; G01B 11/00; G01B 11/26; G01B 11/272; G01B 11/285; G01B 11/303; G01B 11/2416
USPC ...... 219/57, 121.64, 121.83, 121.85, 58, 61; 356/614, 620–624
See application file for complete search history.

(56) References Cited

FOREIGN PATENT DOCUMENTS

| | | |
|---|---|---|
| JP | 05-228634 A | 9/1993 |
| JP | 05-322518 A | 12/1993 |

(Continued)

*Primary Examiner* — Michael Hoang
(74) *Attorney, Agent, or Firm* — Andrews Kurth Kenyon LLP

(57) ABSTRACT

A butt position detecting method for a weld joint, when an arrangement direction of a first member and a second member is defined as a first direction, and a direction that is perpendicular to the first direction is defined as a second direction, the first member has a corner portion and a chamfer portion, and a two-dimensional displacement sensor is arranged at a position offset from the butt portion toward the first member side in the first direction, and such that an angle θs at which the second direction and an optical axis direction of irradiation light of the two-dimensional displacement sensor intersect with each other and an angle θa at which the second direction and a formation direction of the chamfer portion of the first member intersect with each other satisfy a condition expression: 0°<θs<θa.

8 Claims, 17 Drawing Sheets

(51) Int. Cl.
*G01B 5/00* (2006.01)
*G01B 11/25* (2006.01)
*B23K 101/00* (2006.01)
*B23K 101/06* (2006.01)

(56) References Cited

FOREIGN PATENT DOCUMENTS

| | | |
|---|---|---|
| JP | 06-331332 A | 12/1994 |
| JP | 08-187577 A | 7/1996 |
| JP | 08-285524 A | 11/1996 |
| JP | 09-159410 A | 6/1997 |
| JP | 10-311707 A | 11/1998 |
| JP | 11-156577 A | 6/1999 |
| JP | 2004-219154 A | 8/2004 |
| JP | 2010-046695 A | 3/2010 |
| JP | 2010-164377 A | 7/2010 |

METHOD FOR DETECTING BUTT POSITION OF WELD JOINT, DEVICE FOR DETECTING BUTT POSITION OF WELD JOINT, AND METHOD FOR MANUFACTURING WELD JOINT

CROSS REFERENCE TO RELATED APPLICATION

This is a national phase application based on the PCT International Patent Application No. PCT/JP2011/060429 filed on Apr. 28, 2011, the entire contents of which are incorporated herein by reference.

TECHNICAL FIELD

The invention relates to a butt position detecting method for a weld joint and a butt position detecting device for a weld joint that detect a butt position of two members constituting the weld joint, and a manufacturing method for a weld joint that manufactures a weld joint while detecting a butt position of two members constituting the weld joint.

BACKGROUND ART

As for an art of detecting a butt position of two members constituting a weld joint, Patent Document 1 discloses an art that is equipped with a light emitting portion that emits visible light toward a butt portion of members, a photographic device that photographs the butt portion, and butt position means for detecting a dark portion of an image as the butt position, the light emitting portion irradiating the butt portion on both sides of a butt line in a direction perpendicular to the butt line. Then, in the art of this Patent Document 1, the lighting of light emitters is changed over, and that one of the light emitters which exhibits a high degree of edge clarity at the butt portion is allocated to the irradiation of the butt portion.

Besides, Patent Document 2 discloses an art of diagonally emitting light toward a step portion between works by a slit laser oscillator, receiving this reflected light by a CCD line sensor, and calculating a butt position between the works by a microcomputer on the basis of a position where a light quantity of light received by the CCD line sensor has changed from a high light quantity to a low light quantity.

Furthermore, Patent Document 3 discloses an art of taking an image by an image taking portion that moves in an image taking optical axis direction by a predetermined step amount, and detecting a surface shape while suppressing an influence of multiply reflected light in a light-section method.

RELATED ART DOCUMENTS

Patent Documents

Patent Document 1: Japanese Patent Application Publication No. 10-311707 (JP-10-311707 A)
Patent Document 2: Japanese Patent Application Publication No. 11-156577 (JP-11-156577 A)
Patent Document 3: Japanese Patent Application Publication No. 2010-164377 (JP-2010-164377 A)

SUMMARY OF THE INVENTION

Problems to Be Solved by the Invention

However, in the art of Patent Document 1, the lighting of the light emitters that are arranged on both the member sides is changed over, and a suitable light source is selected. Therefore, a great deal of time is spent on a detection process, and a long time is needed to perform a welding process. Thus, it is difficult to introduce the art of Patent Document 1 into the welding process in a production line. Besides, it is indispensable to install two light emitting machines laterally symmetrically (on both the member sides) on a plane perpendicular to a weld line, and install a light receiving machine on the weld line, so that complication of an installation is caused. Besides, a space for installing the light emitters on both the member sides is needed. Therefore, the shape, size and the like of a target part are limited, and the degree of freedom in designing the target part is low.

Besides, the art of Patent Document 2 is only applicable to a work in which a step portion is formed by butting members with different thicknesses against each other. Therefore, the shape of the target work is limited. Besides, as is the case with Patent Document 1, it is indispensable to install a light emitting machine and a light receiving machine laterally symmetrically (on both member sides) on a plane perpendicular to a weld line, so that complication of an installation is caused. Furthermore, a space for installation on both the member sides is needed. Therefore, the shape, size and the like of a target work are limited, and the degree of freedom in designing the target work is low.

Besides, Patent Document 3 necessitates a mechanism that moves in the image taking optical axis direction by the predetermined step amount. Therefore, complication of an installation and a rise in cost are caused.

Moreover, in the case where there is a recess at a butt position between both members of a weld joint, a clear profile of a shape of the butt position is not obtained due to the occurrence of scatter and random reflection of incident light from a light emitter, and it may be difficult to measure an edge portion of the recess. Thus, the butt position between both the members cannot be detected with high accuracy.

It is thus a task of the invention to provide a butt position detecting method for a weld joint and a butt position detecting device for a weld joint that can detect a position of a butt portion between both members with high accuracy while reducing costs, and a manufacturing method for a weld joint that carries out the butt position detecting method.

Means for Solving the Problems

In one aspect of the invention that has been made to solve the aforementioned task, there is provided a butt position detecting method for a weld joint that detects a position of a butt portion, which is formed by butting a joint surface of a first member and a joint surface of a second member against each other, by irradiating the butt portion with irradiation light of a two-dimensional displacement sensor. This butt position detecting method is characterized in that when an arrangement direction of the first member and the second member is defined as a first direction, and a direction which is perpendicular to the first direction and in which the two-dimensional displacement sensor and the first member are arranged is defined as a second direction, the first member has a corner portion that is formed at an end of the joint surface in the second direction, and a chamfer portion that forms the corner portion in a boundary region with the joint surface, that the second member has a corner portion that is formed at an end of the joint surface of the second member in the second direction, and a chamfer portion that forms the corner portion in a boundary region with the joint surface of the second member, that the corner portion of the second member is arranged at a position that is located outside the corner portion of the first member with respect to the second direction, and that the two-dimensional displacement sensor is arranged at a position offset from the butt portion toward the first member side in the first direction such that the chamfer portion of the second member, the corner portion of the second member, and the joint surface of the second member are irradiated with the irradiation light, and such that an angle θs at which the second direction and an optical axis direction of the irradiation light intersect with each other and an angle θa at which the second direction and a formation direction of the chamfer portion of the first member intersect with each other satisfy a condition expression: 0°<θs<θa.

According to this aspect of the invention, the two-dimensional displacement sensor is arranged at a position offset from the butt portion toward the first member side in the first direction, and is arranged inclined at the angle θs with respect to the second direction. Then, this angle θs is set smaller than the angle θa that is formed by the formation direction of the chamfer portion of the first member with respect to the second direction. Thus, scattered light and randomly reflected light at the chamfer portion of the first member are reflected by the second member side, and become unlikely to be received by the two-dimensional displacement sensor. In this manner, the influence of scattered light and randomly reflected light at the chamfer portion of the first member on the two-dimensional displacement sensor can be eliminated with a simple mechanism, and a clearer two-dimensional cross-sectional profile can be measured by the two-dimensional displacement sensor. Accordingly, the position of the butt portion, which is formed by butting the joint surface of the first member and the joint surface of the second member against each other, can be detected with high accuracy on the basis of this two-dimensional cross-sectional profile, while reducing costs. Besides, the corner portion of the second member is always exposed when viewed from the position at which the two-dimensional displacement sensor is arranged. Thus, on the two-dimensional cross-sectional profile that is measured by the two-dimensional displacement sensor, the corner portion of the second member is always clearly apparent. Accordingly, it is easy to specify the position of the corner portion of the second member on this second-dimensional cross-sectional profile.

In the foregoing aspect of the invention, it is preferable that the position of the butt portion be detected by specifying a position of the corner portion of the second member in a two-dimensional cross-sectional profile that is measured by the two-dimensional displacement sensor.

According to this aspect of the invention, the position of the butt portion, which is formed by butting the joint surface of the first member and the joint surface of the second member against each other, can be more reliably detected with high accuracy.

In the foregoing aspect of the invention, it is preferable that a lower-limit of a dimension that indicates a position of the corner portion of the second member in the second direction be set larger than an upper-limit of a dimension that indicates a position of the corner portion of the first member in the second direction.

According to this aspect of the invention, the positional relationship between the corner portion of the first member and the corner portion of the second member can be managed since the stage of designing the first member and the second member. Thus, the corner portion of the second member can be set in such a manner as to be definitely exposed as viewed from the position at which the two-dimensional displacement sensor is arranged. Accordingly, the position of the butt portion, which is formed by the joint surface of the first member and the joint surface of the second member against each other, can be still more reliably detected with high accuracy.

In the foregoing aspect of the invention, it is preferable that the first member be a differential case, and that the second member be a ring gear.

According to this aspect of the invention, the position of the butt portion of the differential case and the ring gear can be detected with high accuracy. Then, while the position of the butt portion of the differential case and the ring gear and the position of welding means are adjusted on the basis of this detection result, the butt portion of the differential case and the ring gear is welded. Thus, the weld joint that is constituted of the differential case and the ring gear with excellent welding quality can be manufactured.

In another aspect of the invention that has been made to solve the aforementioned task, there is provided a butt position detecting device for a weld joint that detects a position of a butt portion, which is formed by butting a joint surface of a first member and a joint surface of a second member against each other, by irradiating the butt portion with irradiation light of a two-dimensional displacement sensor. This butt position detecting device is characterized in that when an arrangement direction of the first member and the second member is defined as a first direction, and a direction which is perpendicular to the first direction and in which the two-dimensional displacement sensor and the first member are arranged is defined as a second direction, the first member has a corner portion that is formed at an end of the joint surface in the second direction, and a chamfer portion that forms the corner portion in a boundary region with the joint surface, that the second member has a corner portion that is formed at an end of the joint surface of the second member in the second direction, and a chamfer portion that forms the corner portion in a boundary region with the joint surface of the second member, that the corner portion of the second member is arranged at a position that is located outside the corner portion of the first member with respect to the second direction, and that the two-dimensional displacement sensor is arranged at a position offset from the butt portion toward the first member side in the first direction such that the chamfer portion of the second member, the corner portion of the second member, and the joint surface of the second member are irradiated with the irradiation light, and such that an angle θs at which the second direction and an optical axis direction of the irradiation light intersect with each other and an angle θa at which the second direction and a formation direction of the chamfer portion of the first member intersect with each other satisfy a condition expression: 0°<θs<θa.

According to this aspect of the invention, the two-dimensional displacement sensor is arranged at a position offset from the butt portion toward the first member side in the first direction, and is arranged inclined at the angle θs with respect to the second direction. Then, this angle θs is set smaller than the angle θa that is formed by the formation direction of the chamfer portion of the first member with respect to the second direction. Thus, scattered light and randomly reflected light at the chamfer portion of the first member are reflected by the second member side, and become unlikely to be received by the two-dimensional displacement sensor. In this manner, the influence of scattered light and randomly reflected light at the chamfer portion of the first member on the two-dimensional displacement sensor can be eliminated with a simple mechanism, and a clearer two-dimensional cross-sectional profile can be measured by the two-dimensional displacement sensor. Accordingly, the position of the butt portion, which is formed by butting the joint surface of the first member and the joint surface of the second member against each other, can be detected with high accuracy on the basis of this two-dimensional cross-sectional profile, while reducing costs. Besides, the corner portion of the second member is always exposed when viewed from the position at which the two-dimensional displacement sensor is arranged. Thus, on the two-dimensional cross-sectional profile that is measured by the two-dimensional displacement sensor, the corner portion of the second member is always clearly apparent. Accordingly, it is easy to specify the position of the corner portion of the second member on this second-dimensional cross-sectional profile.

In still another aspect of the invention that has been made to solve the aforementioned task, there is provided a manufacturing method for a weld joint in which a butt portion, which is formed by butting a joint surface of a first member and a joint surface of a second member against each other, is subjected to joining performed by welding means. This manufacturing method is characterized in that when an arrangement direction of the first member and the second member is defined as a first direction, and a direction which is perpendicular to the first direction and in which the two-dimensional displacement sensor and the first member are arranged is defined as a second direction, the first member has a corner portion that is formed at an end of the joint surface in the second direction, and a chamfer portion that forms the corner portion in a boundary region with the joint surface, that the second member has a corner portion that is formed at an end of the joint surface of the second member in the second direction, and a chamfer portion that forms the corner portion in a boundary region with the joint surface of the second member, that the corner portion of the second member is arranged at a position that is located outside the corner portion of the first member with respect to the second direction, that the two-dimensional displacement sensor is arranged at a position offset from the butt portion toward the first member side in the first direction such that the chamfer portion of the second member, the corner portion of the second member, and the joint surface of the second member are irradiated with the irradiation light of the two-dimensional displacement sensor, and such that an angle θs at which the second direction and an optical axis direction of irradiation light of the two-dimensional displacement sensor intersect with each other and an angle θa at which the second direction and a formation direction of the chamfer portion of the first member intersect with each other satisfy a condition expression: 0°<θs<θa, and the butt portion is irradiated with the irradiation light to detect a position of the butt portion, and that a position of the welding means is corrected on a basis of a detection result of the position of the butt portion, and the butt portion is subjected to joining performed by the welding means.

According to this aspect of the invention, the two-dimensional displacement sensor is arranged at a position offset from the butt portion toward the first member side in the first direction, and is arranged inclined at the angle θs with respect to the second direction. Then, this angle θs is set smaller than the angle θa that is formed by the formation direction of the chamfer portion of the first member with respect to the second direction. Thus, scattered light and randomly reflected light at the chamfer portion of the first member are reflected by the second member side, and become unlikely to be received by the two-dimensional displacement sensor. In this manner, the influence of scattered light and randomly reflected light at the chamfer portion of the first member on the two-dimensional displacement sensor can be eliminated with a simple mechanism, and a clearer two-dimensional cross-sectional profile can be measured by the two-dimensional displacement sensor. Accordingly, the position of the butt portion, which is formed by butting the joint surface of the first member and the joint surface of the second member against each other, can be detected with high accuracy on the basis of this two-dimensional cross-sectional profile, while reducing costs. Then, the position of the welding means is corrected on the basis of a detection result of the position of this butt portion. Therefore, the welding quality of the weld joint is enhanced. Besides, the corner portion of the second member is always exposed when viewed from the position at which the two-dimensional displacement sensor is arranged. Thus, on the two-dimensional cross-sectional profile that is measured by the two-dimensional displacement sensor, the corner portion of the second member is always clearly apparent. Accordingly, it is easy to specify the position of the corner portion of the second member on this second-dimensional cross-sectional profile.

Effect of the Invention

The butt position detecting method for the weld joint according to the invention, the butt position detecting device for the weld joint according to the invention, and the manufacturing method for the weld joint according to the invention make it possible to detect the position of the butt portion between both the members with high accuracy, while reducing costs.

MODE FOR CARRYING OUT THE INVENTION

An embodiment that is obtained by embodying the invention will be described hereinafter in detail with reference to the accompanying drawings. In this case, as one example, a weld joint that is formed by butting a differential case and a ring gear, which are component parts of a differential device of a vehicle such as an automobile or the like, against each other will now be described citing an example.

[Manufacturing System for Weld Joint]

Figure 1:
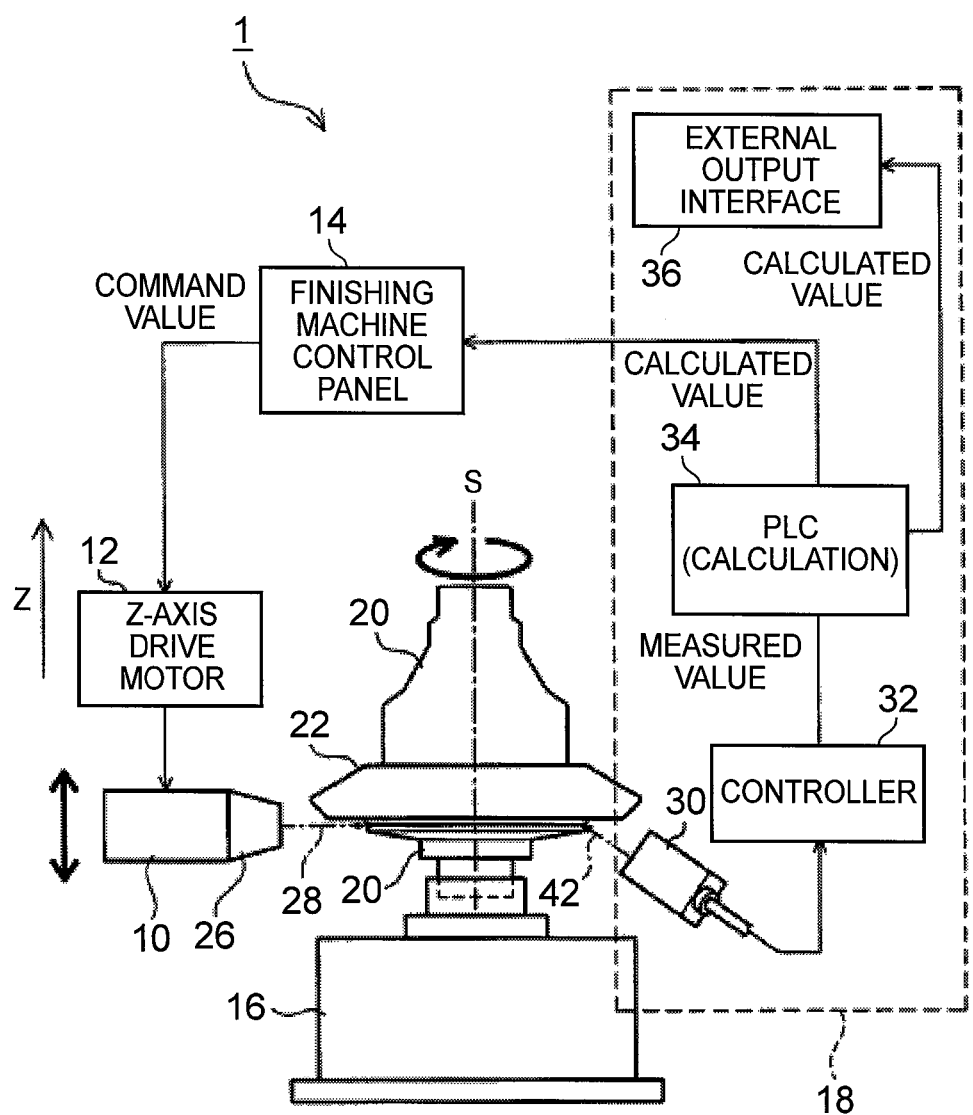
FIG. 1 is a block diagram of a manufacturing system for a weld joint according to this embodiment of the invention.
Figure 2:
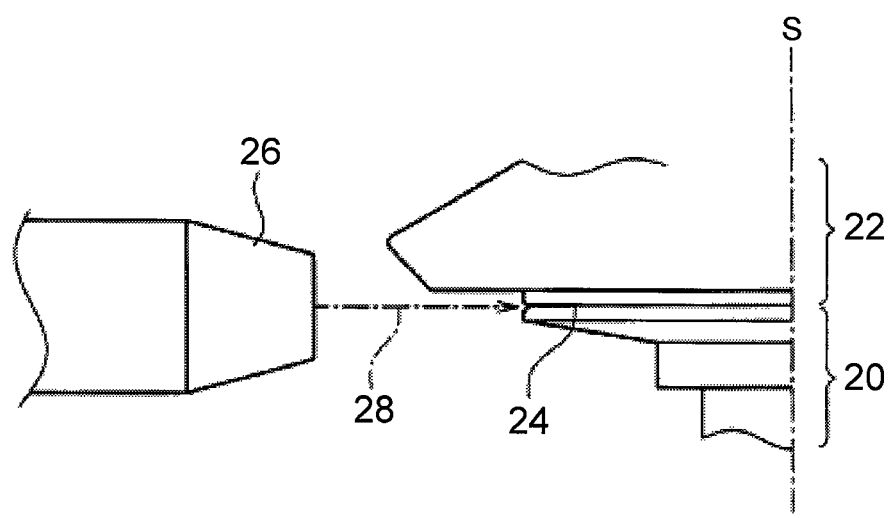
FIG. 2 is an enlarged view of the periphery of a welded region.

As shown in FIG. 1, a manufacturing system 1 for a weld joint according to this embodiment of the invention has a weld head 10, a Z-axis drive motor 12, a finishing machine control panel 14, a rotational drive portion 16, a position detecting device 18 and the like. As shown in FIG. 2, the weld head 10 irradiates a butt portion 24, which is formed by butting a joint surface (see FIG. 6) of a differential case 20 and a joint surface 47 (see FIG. 6) of a ring gear 22 against each other, with a laser 28 from a tip portion 26, thus joining the differential case 20 and the ring gear 22 to each other through welding. The ring gear 22 is press-fitted into the differential case 20 downward from above in FIG. 1, and is arranged butted against the differential case 20 at the butt portion 24. Incidentally, the ring gear 22 may be either a hypoid gear or a helical gear. Besides, FIG. 1 is a block diagram of the manufacturing system 1 for the weld joint, and FIG. 2 is an enlarged view of the periphery of a welded region. Besides, the differential case 20 is an example of "the first member" in the invention, and the ring gear 22 is an example of "the second member" in the invention.

Figure 3:
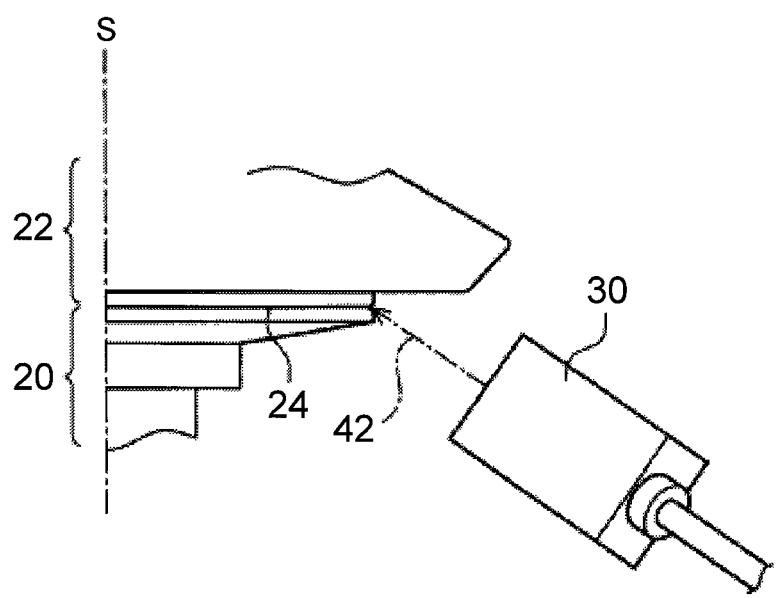
FIG. 3 is an enlarged view of the periphery of a sensor head.

The Z-axis drive motor 12 moves the weld head 10 in a Z-axis direction (a vertical direction in FIG. 1) as an arrangement direction of the differential case 20 and the ring gear 22, and corrects the position of the weld head 10 as to the Z-axis direction. The finishing machine control panel 14 sends to the Z-axis drive motor 12 a command value on the correction of the position of the weld head 10 in the Z-axis direction, and controls the driving of the Z-axis drive motor 12. The rotational drive portion 16 rotates the differential case 20 and the ring gear 22 around a central axis S. The position detecting device 18 is a device that detects a position of the butt portion 24 of the differential case 20 and the ring gear 22 using a sensor head 30 as shown in FIG. 3, and will be described later in detail. Incidentally, FIG. 3 is an enlarged view of the periphery of the sensor head 30. Besides, the Z-axis direction is an example of "the first direction" in the invention, and is a direction of the central axis S of the differential case 20 and the ring gear 22.

[Manufacturing Method for Weld Joint]

Figure 4:
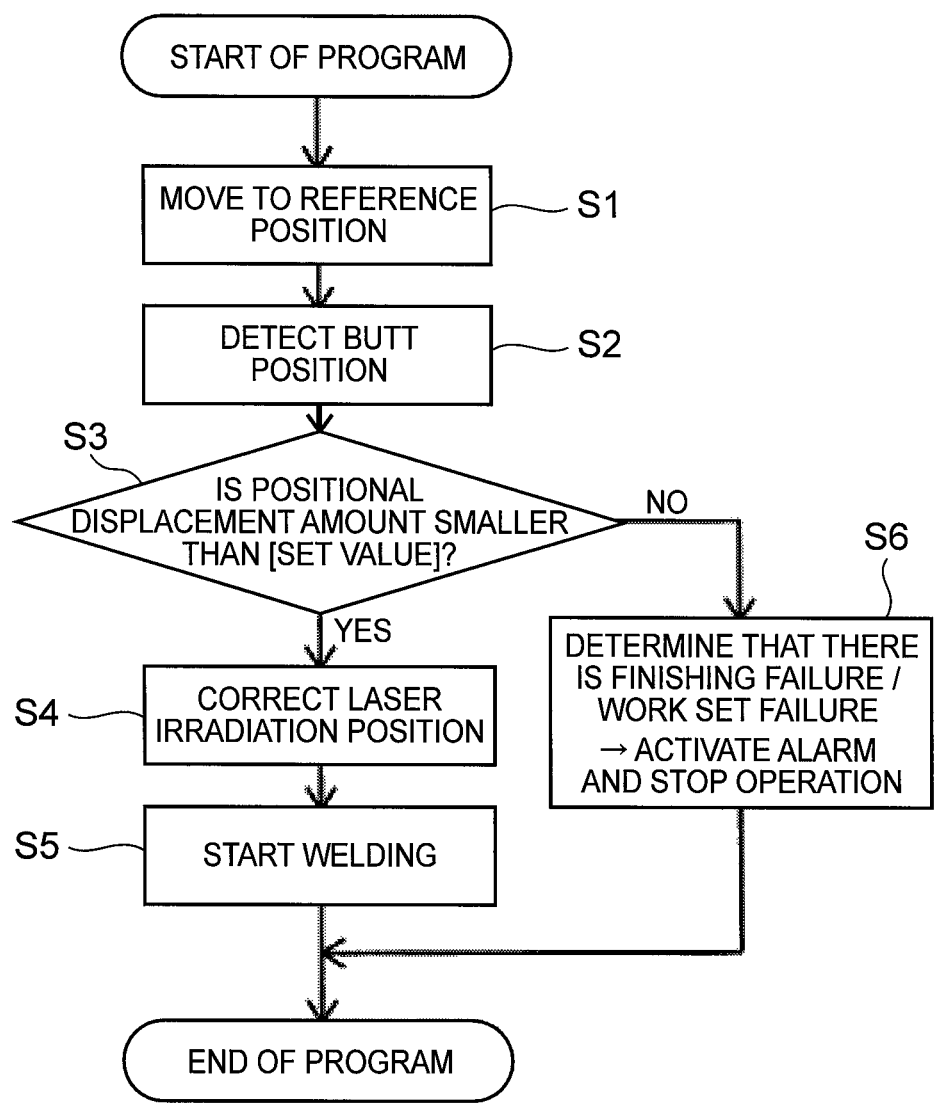
FIG. 4 is a flowchart of a manufacturing method for the weld joint according to this embodiment of the invention.

Next, a method of manufacturing a weld joint, which is constituted of the differential case 20 and the ring gear 22, by the manufacturing system 1 for the weld joint will be described. It should be noted herein that FIG. 4 is a flowchart in the manufacturing method for the weld joint that is constituted of the differential case 20 and the ring gear 22. As shown in FIG. 4, if a manufacturing program for the weld joint starts, the weld head 10 is first moved to a reference position in each of the X-axis direction, the Y-axis direction and the Z-axis direction (step S1). Subsequently, a butt position of the differential case 20 and the ring gear 22 (a position of the butt portion 24) is detected by the position detecting device 18 (step S2). Incidentally, a butt position detecting method will be described later in detail.

Subsequently, it is determined whether or not a positional displacement amount of the detected butt position from a predetermined reference position is smaller than a set value (step S3). This set value is a value that is arbitrarily set in accordance with a required weld quality or the like, and is equal to, for example, 0.05 mm. Then, if the positional displacement amount is smaller than the set value, the position of the weld head 10 in the Z-axis direction is corrected on the basis of a command value from the finishing machine control panel 14, and an irradiation position of the laser 28 is corrected (step S4). Then, after the irradiation position of the laser 28 is thus corrected, the butt portion 24 of the differential case 20 and the ring gear 22 is irradiated with the laser 28 from the tip portion 26 of the weld head 10, and the welding of the differential case 20 and the ring gear 22 is started, while the differential case 20 and the ring gear 22 are rotated around the central axis S (step S5). Then, if the welding of the butt portion 24 is completed as to the entire circumference of the differential case 20 and the ring gear 22, the manufacturing program for the weld joint is ended. In this manner, the weld joint that is constituted of the differential case 20 and the ring gear 22 is manufactured. Incidentally, if the positional displacement amount is larger than the set value in step S3, it is determined that there is a finishing failure or a setting failure (an installation failure) in works (the differential case 20 and the ring gear 22), and an alarm is activated to stop the operation of the manufacturing system 1 for the weld joint (step S6). The foregoing is the description of the method of manufacturing the weld joint, which is constituted of the differential case 20 and the ring gear 22, by the manufacturing system 1 for the weld joint.

[Butt Position Detecting Device for Weld Joint]

Next, the position detecting device 18 as an example of the butt position detecting device for the weld joint according to the invention will be described. The position detecting device 18 includes the sensor head 30 as an optical two-dimensional displacement sensor that measures a two-dimensional cross-sectional profile according to a light-section method through the use of a slit laser 42 (a band-shaped laser) (see FIG. 5). Then, the position detecting device 18 is a device that outputs positional information (a coordinate) on a measuring point that is specified in the two-dimensional cross-sectional profile measured by the sensor head 30. As shown in the aforementioned FIG. 1, the position detecting device 18 includes the sensor head 30, a controller 32, a PLC 34, an external output interface 36, and the like.

Figure 5:
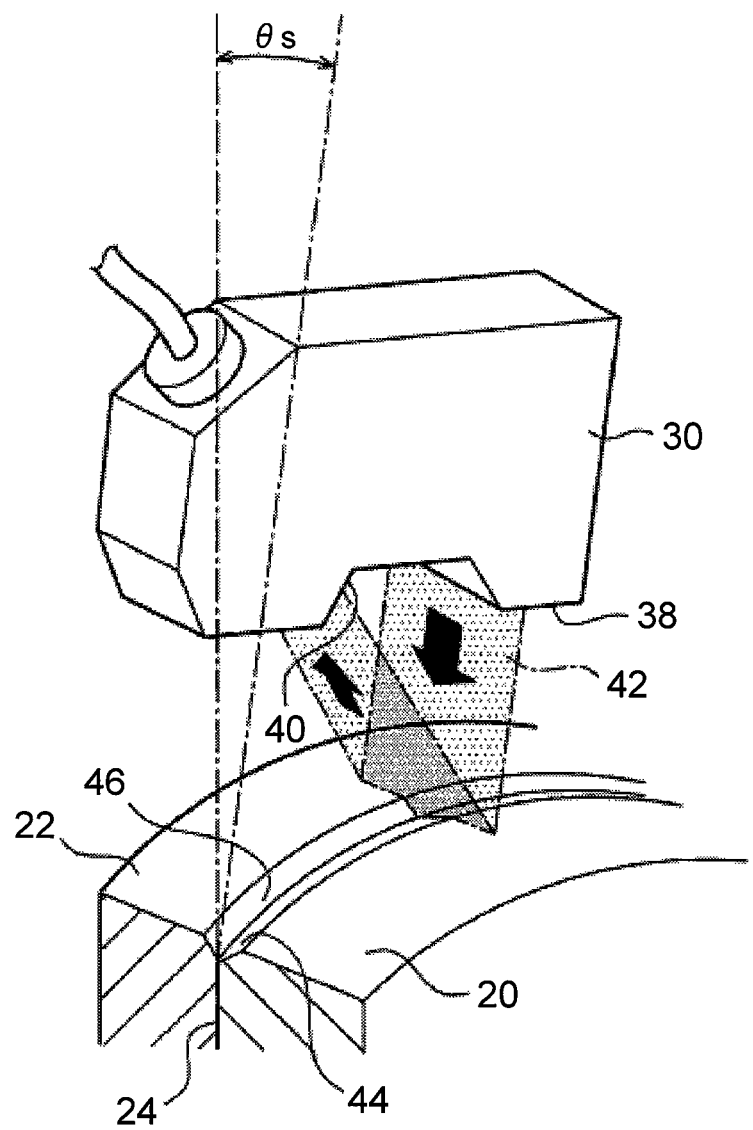
FIG. 5 is an outline perspective view of the periphery of the sensor head.

As shown in FIG. 5, the sensor head 30 includes a light emitting portion 38 and a light receiving portion 40. Then, this sensor head 30 causes a surface in the periphery of the butt portion 24 of the differential case 20 and the ring gear 22 to reflect the slit laser 42 radiated from the light emitting portion 38, and receives the reflected light at the light receiving portion 40, thereby measuring a two-dimensional cross-sectional profile (a two-dimensional cross-sectional shape). Incidentally, the slit laser 42 is an example of "the irradiation light" in the invention.

Figure 6:
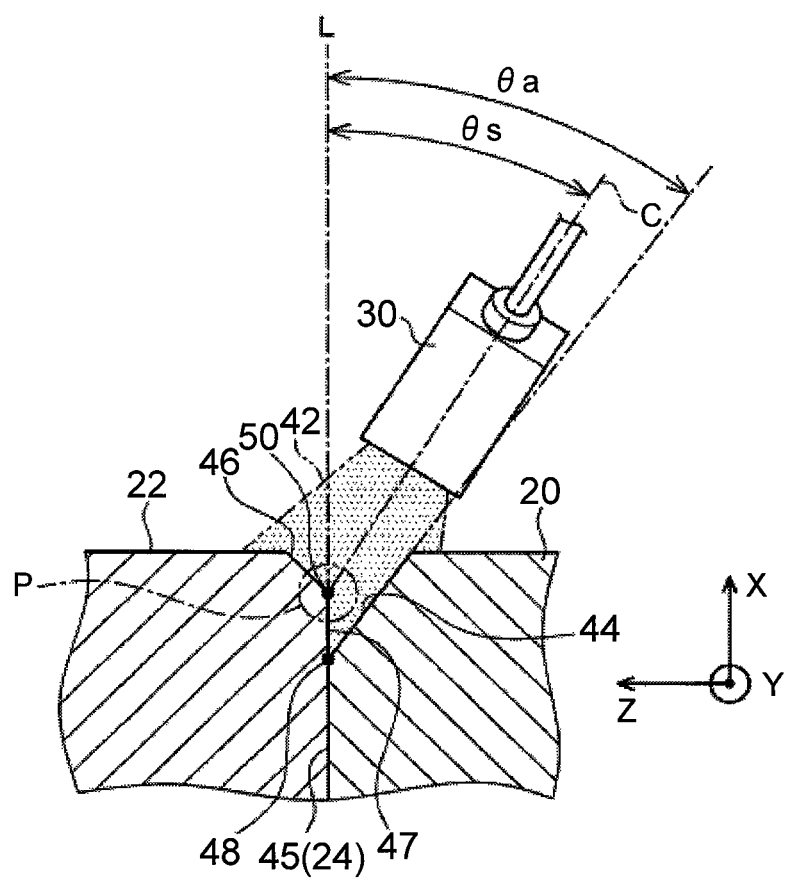
FIG. 6 is an illustrative view about the arrangement of the sensor head.

It should be noted herein that as shown in FIG. 6, the differential case 20 has a chamfer portion 44, a joint surface 45, and a corner portion 48, and the corner portion 48 is formed in a boundary region between the chamfer portion 44 and the joint surface 45 at an end of the joint surface 45 (the butt portion 24) in the X-axis direction (an upward direction in FIG. 6). Besides, the ring gear 22 has a chamfer portion 46, a joint surface 47, and a corner portion 50, and the corner portion 50 is formed in a boundary region between the chamfer portion 46 and the joint surface 47 at an end of the joint surface 47 (the butt portion 24) in the X-axis direction. Then, in this embodiment of the invention, this corner portion 50 is used as a measuring point P. Incidentally, the X-axis direction is an example of "the second direction" in the invention, and is a direction which is perpendicular to the Z-axis direction and in which the sensor head 30 and the differential case 20 are arranged. That is, the X-axis direction is a radial direction of the differential case 20 and the ring gear 22.

Then, as shown in FIG. 6, the sensor head 30 is arranged on a side where the differential case 20 is located, with respect to a weld line L in the Z-axis direction (a lateral direction in FIG. 6). In this manner, the sensor head 30 is arranged on a side of the butt portion 24, where the differential case 20 is located, in the Z-axis direction.

Furthermore, the sensor head 30 is arranged such that an angle θs at which the X-axis direction and a direction of an optical axis C of the slit laser 42 of the sensor head 30 intersect with each other (i.e., an inclination of the optical axis C of the slit laser 42 of the sensor head 30 with respect to the weld line L) and an angle θa at which the X-axis direction and a formation direction of the chamfer portion 44 of the differential case 20 intersect with each other (i.e., an inclination of the chamfer portion 44 of the differential case 20 with respect to the weld line L) satisfy a condition expression as a mathematical expression shown below.

$$0° < θs < θa \qquad \text{[Expression 1]}$$

It should be noted herein that the weld line L is a tangential line of the corner portion 48 of the differential case 20 and the corner portion 50 of the ring gear 22. Besides, the optical axis C of the slit laser 42 of the sensor head 30 is a central axis of the slit laser 42 in the width direction. Then, the sensor head 30 thus arranged irradiates the periphery of the chamfer portion 44, the chamfer portion 46 and the joint surface 47 with the slit laser 42 from the light emitting portion 38. Incidentally, FIG. 5 is an outline perspective view of the periphery of the sensor head 30, and FIG. 6 is an illustrative view about the arrangement of the sensor head 30. Besides, FIG. 6 is a view of the sensor head 30 as viewed from a lateral surface direction. In FIG. 6, the light emitting portion 38 and the light receiving portion 40 are in such a positional relationship as to be overlapped with each other in the depth direction of the drawing.

Incidentally, the sensor head 30 is arranged at a position that is symmetrical to the weld head 10 with respect to the central axis S of the differential case 20 and the ring gear 22 (i.e., a position that is reached by rotating the weld head 10 by 180° in a rotational direction of the differential case 20 and the ring gear 22) in the example shown in the aforementioned FIG. 1. However, the arrangement position of the sensor head 30 is not limited to this, but may be arranged at another position in the rotational direction of the differential case 20 and the ring gear 22.

Besides, the controller 32 sends a measured value of the sensor head 30 to the PLC 34. The PLC 34 is a programmable controller, obtains through calculation a positional displacement amount of the butt portion 24 of the differential case 20 and the ring gear 22 on the basis of the acquired measured value, and sends the obtained calculated value to the finishing machine control panel 14 and the external output interface 36. The external output interface 36 is connected to display means (not shown) such as a display or the like, and displays the positional displacement amount of the butt portion 24 of the differential case 20 and the ring gear 22 on the display means on the basis of the calculated value acquired from the PLC 34.

Figure 7:
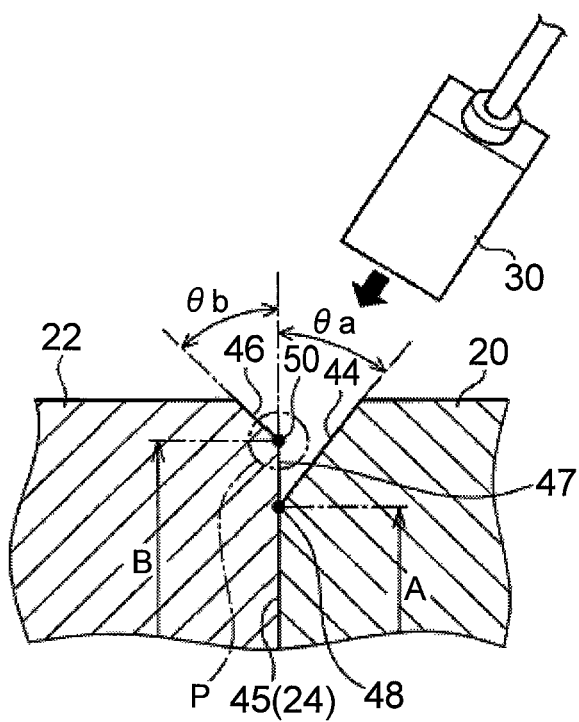
FIG. 7 is a cross-sectional view of the periphery of a chamfer portion of a differential case and a chamfer portion of a ring gear.
Figure 8:
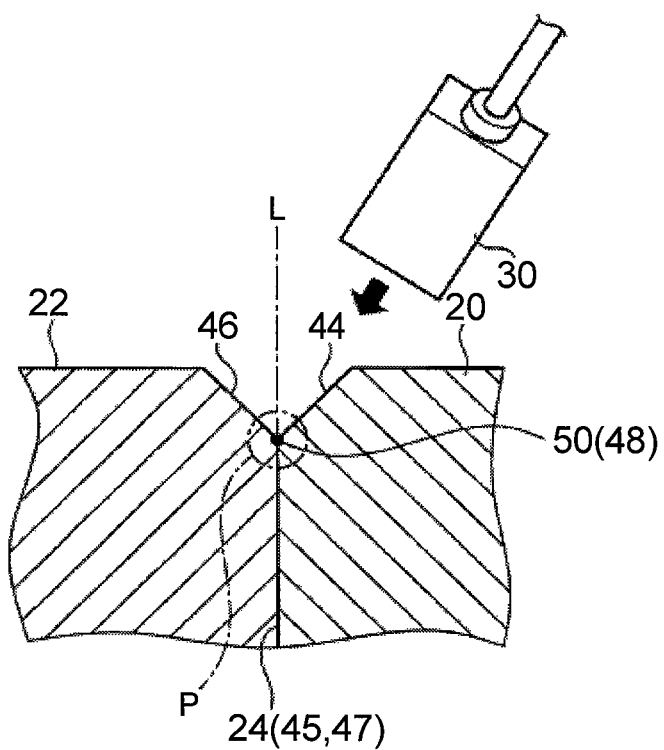
FIG. 8 is a cross-sectional view of the periphery of the chamfer portion of the differential case and the chamfer portion of the ring gear.

Besides, in this embodiment of the invention, the dimensions of the chamfer portion 44 and the chamfer portion 46 and the tolerances thereof are set such that the corner portion 50 of the ring gear 22, which is located on the other side of the sensor head 30 across the weld line L, is exposed radially outward when the differential case 20 and the ring gear 22 are butted against each other. That is, as shown in FIG. 7, the corner portion 50 of the ring gear 22 is arranged radially outward of the corner portion 48 of the differential case 20 when the differential case 20 and the ring gear 22 are butted against each other. Alternatively, as shown in FIG. 8, the corner portion 50 of the ring gear 22 and the corner portion 48 of the differential case 20 are arranged at the same position in the radial direction when the differential case 20 and the ring gear 22 are butted against each other.

Figure 9:
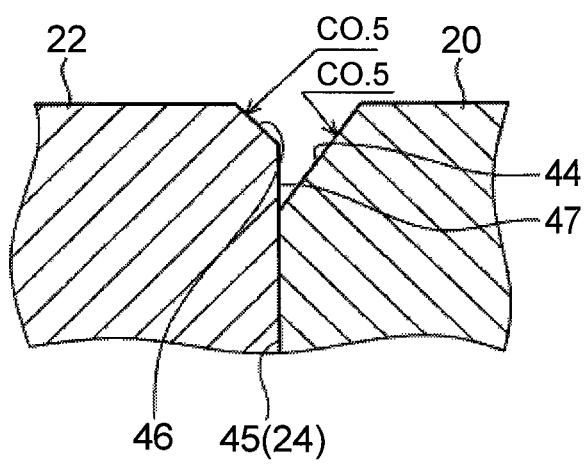
FIG. 9 is an illustrative view of a dimensional instruction of a general chamfer portion.

More specifically, while the dimension of the chamfer portion 44 of the differential case 20 and the chamfer portion 46 of the ring gear 22 is generally set as, for example, "C 0.5" as shown in FIG. 9, the dimensions and tolerances of a dimension A, a dimension B, a chamfer angle θa, and a chamfer angle θb are set as shown in the aforementioned FIG. 7 in this embodiment of the invention. Then, the lower-limit of the tolerance of the dimension B is set equal to or larger than the upper-limit of the tolerance of the dimension A. Thus, in designing the differential case 20 and the ring gear 22, the corner portion 50 of the ring gear 22 can be managed in such a manner as to be arranged as shown in the aforementioned FIGS. 7 and 8. It should be noted herein that the dimension A is a radial dimension (a dimension in the X-axis direction) that indicates a position of the corner portion 48 of the differential case 20, and the dimension B is a radial dimension (a dimension in the X-axis direction)' that indicates a position of the corner portion 50 of the ring gear 22. Besides, the chamfer angle θa is an angle that is formed by the chamfer portion 44 of the differential case 20 with the weld line L, and the chamfer angle θb is an angle that is formed by the chamfer portion 46 of the ring gear 22 with the weld line L. Incidentally, FIGS. 7 and 8 are cross-sectional views of the periphery of the chamfer portion 44 of the differential case 20 and the chamfer portion 46 of the ring gear 22, and FIG. 9 is an illustrative view about a dimensional instruction of a general chamfer portion.

[Butt Position Detecting Method]

A position of the butt portion 24 of the differential case 20 and the ring gear 22 is detected as follows by the position detecting device 18 thus configured. First of all, the sensor head 30 irradiates the periphery of the butt portion 24 of the differential case 20 and the ring gear 22 with the slit laser 42 from the light emitting portion 38, and receives the reflected slit laser 42 at the light receiving portion 40. In this manner, a two-dimensional cross-sectional profile of the periphery of the butt portion 24 is measured by the sensor head 30.

Then, the controller 32 specifies a position of the corner portion 50 of the ring gear 22 on the two-dimensional cross-sectional profile measured by the sensor head 30, thereby detecting a position of the butt portion 24. Information (a measured value) on the position of the butt portion 24 thus detected is sent to the PLC 34 via the controller 32. Then, the PLC 34 obtains through calculation a positional displacement amount of the butt portion 24 from the predetermined reference position, on the basis of the acquired information on the position of the butt portion 24. Then, the PLC 34 sends the obtained calculated value to the finishing machine control panel 14 and to the external output interface 36, thus displaying the positional displacement amount of the butt portion 24 by the display means (not shown). In the manner described above, the position of the butt portion 24 of the differential case 20 and the ring gear 22 is detected by the position detecting device 18.

It should be noted herein that the sensor head 30 is arranged inclined at the angle θs with respect to the weld line L as described above. Thus, light of the slit laser 42 that has been scattered or randomly reflected at the chamfer portion 44 of the differential case 20 is reflected toward the chamfer portion 46 side of the ring gear 22, and hence is unlikely to be received by the light receiving portion 40 of the sensor head 30. In this manner, with a simple mechanism, the influence of scatter and random reflection of the slit laser 42 on the chamfer portion 44 of the differential case 20 can be eliminated. Accordingly, a clear two-dimensional cross-sectional profile can be measured by the sensor head 30. Therefore, the position of the butt portion 24 can be detected with high accuracy while reducing the costs needed to detect the position of the butt portion 24 of the differential case 20 and the ring gear 22.

Besides, when the differential case 20 and the ring gear 22 are butted against each other, the corner portion 50 of the ring gear 22 is always exposed as viewed from the position where the sensor head 30 is arranged. Thus, the positional information on the corner portion 50 of the ring gear 22 that serves as the measuring point P can be reliably acquired from the two-dimensional cross-sectional profile measured by the sensor head 30. Then, the position of the butt portion 24 of the differential case 20 and the ring gear 22 can be detected from the positional information on the corner portion 50 of the ring gear 22. In this manner, the position of the butt portion 24 of the differential case 20 and the ring gear 22 can be reliably detected with high accuracy.

[Evaluation on Detection Error of Butt Position]

Next, an evaluation result about a detection error of the butt position of the differential case 20 and the ring gear 22 will be described. Incidentally, FIGS. 11, 13, 15, 16 and 17 are views showing this evaluation result. In each of FIGS. 11, 13, 15, 16 and 17, the axis of abscissa represents a measurement position (an NC coordinate), and the axis of ordinate represents a sensor measurement value. It should be noted herein that the measurement position (the NC coordinate) represents a positional coordinate of the corner portion 50 of the ring gear 22 in the Z-axis direction (the arrangement direction of the differential case 20 and the ring gear 22) with respect to the optical axis C (see FIG. 6) of the slit laser 42 of the sensor head 30. Then, the optical axis C and the corner portion 50 are set in such a manner as to intersect with each other when the measurement position is 0. Besides, the sensor measurement value is a value that represents the position of the corner portion 50 of the ring gear 22 in the Z-axis direction (the arrangement direction of the differential case 20 and the ring gear 22), which is detected on the basis of the two-dimensional cross-sectional profile measured by the sensor head 30. Then, in the current evaluation, while a plurality of measurement positions were set, a sensor measurement value for each of the set measurement positions was checked.

Figure 10:
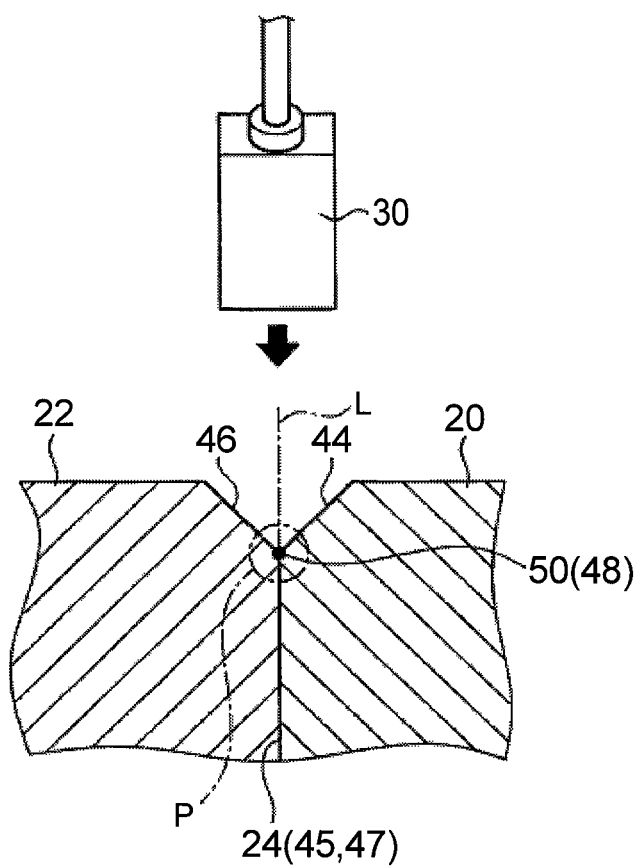
FIG. 10 is a cross-sectional view showing a case where a position of a corner portion of the differential case and a position of a corner portion of the ring gear are matched with each other and the sensor head is arranged parallel to a weld line.
Figure 11:
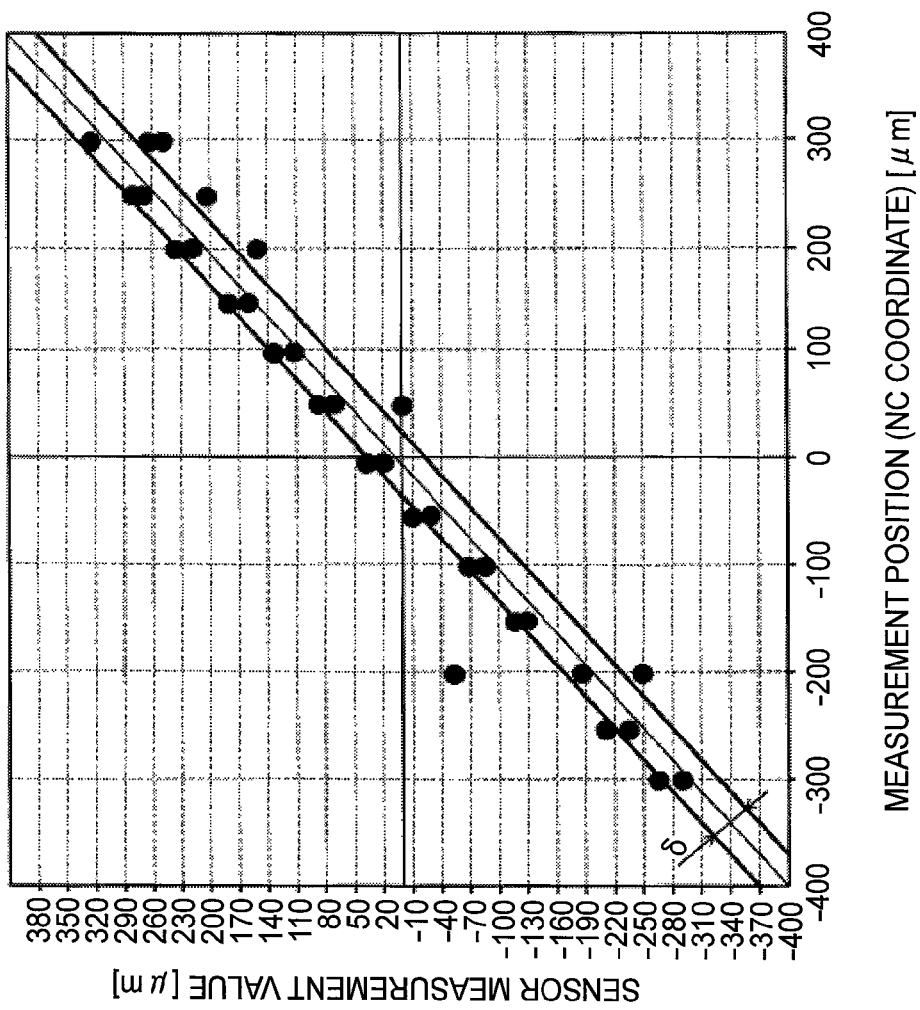
FIG. 11 is a view showing an evaluation result about a detection error of a butt position in the case shown in FIG. 10.

First of all, in the case where the position of the corner portion 48 of the differential case 20 and the position of the corner portion 50 of the ring gear 22 were matched with each other as shown in FIG. 10, and the optical axis C of the slit laser 42 of the sensor head 30 was arranged parallel to the weld line L, an evaluation result as shown in FIG. 11 was obtained. According to the evaluation result shown in FIG. 11, a detection error exceeding a provisional target error range δ was created in the sensor measurement value, for example, when the measurement position (the NC coordinate) was 50 µm or the like.

Figure 12:
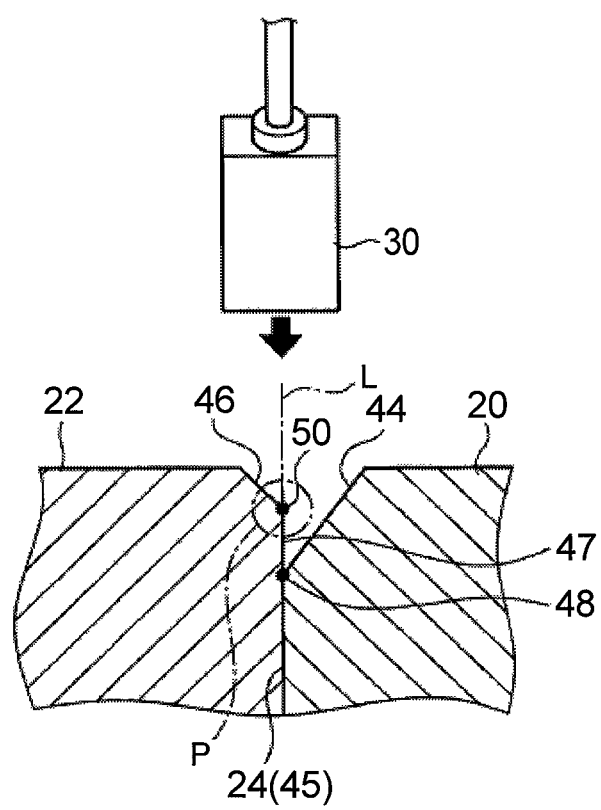
FIG. 12 is a cross-sectional view showing a case where the corner portion of the ring gear is arranged radially outward of the corner portion of the differential case and the sensor head is arranged parallel to the weld line.
Figure 13:
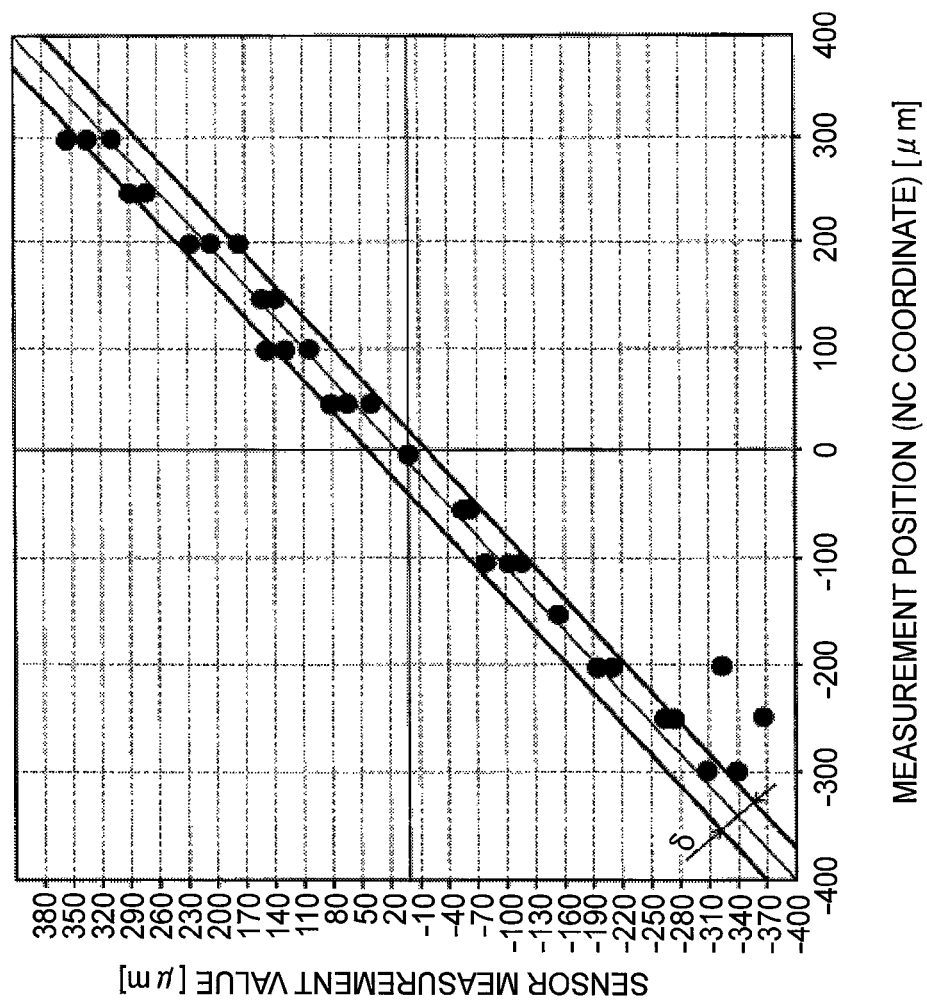
FIG. 13 is a view showing an evaluation result about a detection error of a butt position in the case shown in FIG. 12.

Besides, in the case where the corner portion 50 of the ring gear 22 was located radially outward (above in FIG. 12) of the corner portion 48 of the differential case 20 as shown in FIG. 12, and the optical axis C of the slit laser 42 of the sensor head 30 was arranged parallel to the weld line L, an evaluation result as shown in FIG. 13 was obtained. According to the evaluation result shown in FIG. 13, a detection error exceeding the provisional target error range δ was created in the sensor measurement value, for example, when the measurement position (the NC coordinate) was −200 µm or the like.

Figure 14:
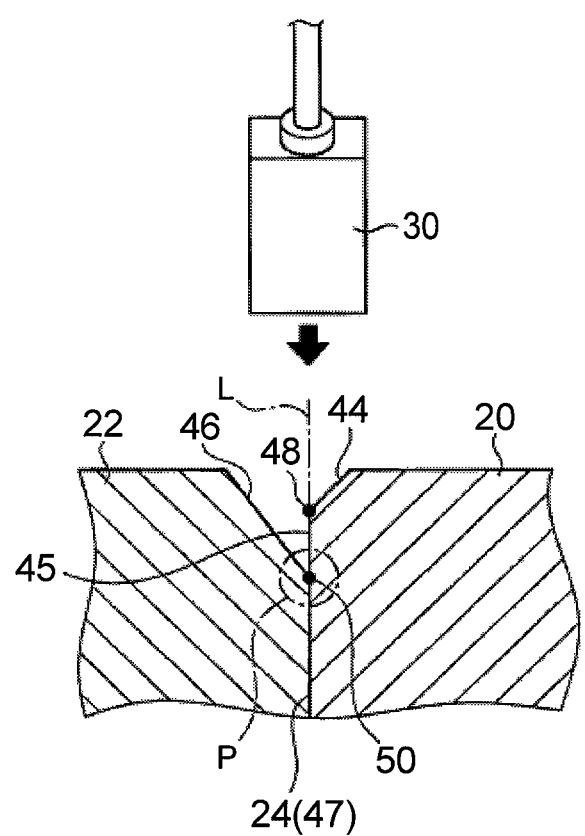
FIG. 14 is a cross-sectional view showing a case where the corner portion of the ring gear is arranged radially inward of the corner portion of the differential case and the sensor head is arranged parallel to the weld line.
Figure 15:
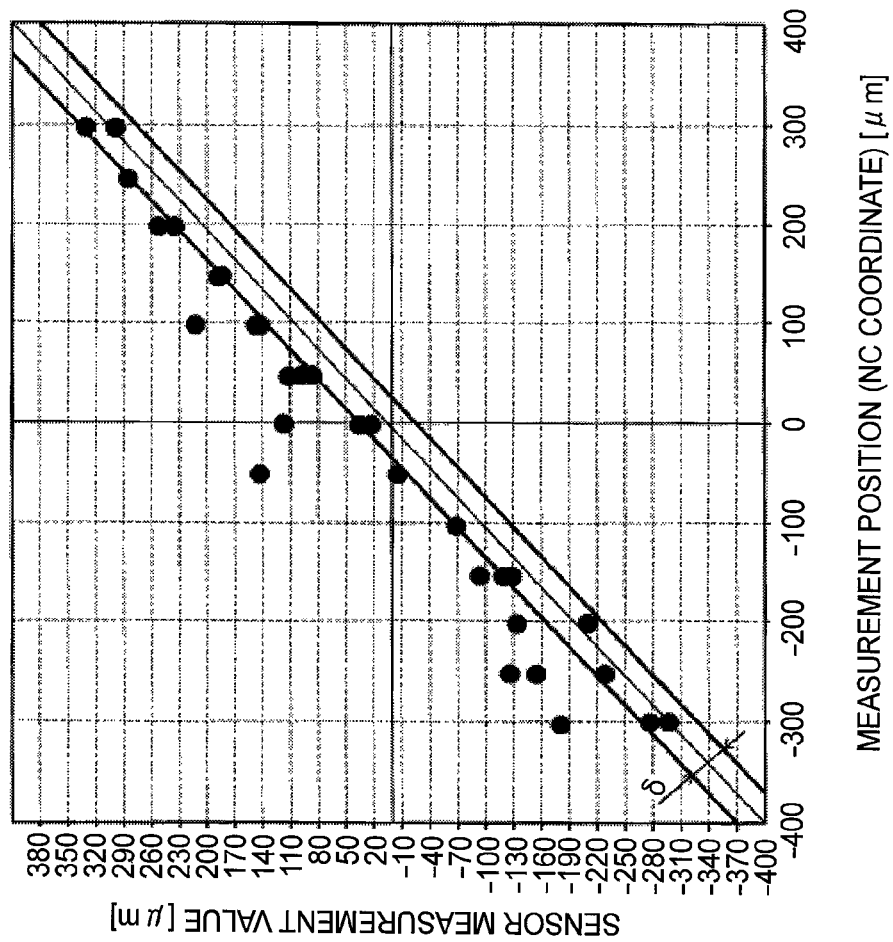
FIG. 15 is a view showing an evaluation result about a detection error of a butt position in the case shown in FIG. 14.

Besides, in the case where the corner portion 50 of the ring gear 22 was located radially inward (below in FIG. 14) of the corner portion 48 of the differential case 20 as shown in FIG. 14, and the optical axis C of the slit laser 42 of the sensor head 30 was arranged parallel to the weld line L, an evaluation result as shown in FIG. 15 was obtained. According to the evaluation result shown in FIG. 15, a detection error exceeding the provisional target error range δ was created in the sensor measurement value, for example, when the measurement position (the NC coordinate) was 0 µm or the like.

The reason why the detection error exceeding the provisional target error range δ was thus created in the sensor measurement value in each of FIGS. 11, 13 and 15 is considered to consist in that, due to the arrangement of the optical axis C of the slit laser 42 of the sensor head 30 parallel to the weld line L, the slit laser 42 radiated from the light emitting portion 38 of the sensor head 30 is scattered or randomly reflected at the chamfer portion 44 of the differential case 20 or the chamfer portion 46 of the ring gear 22, this scattered light and this randomly reflected light are received by the light receiving portion 40 of the sensor head 30, and a clear two-dimensional cross-sectional profile cannot be measured by the sensor head 30.

Figure 16:
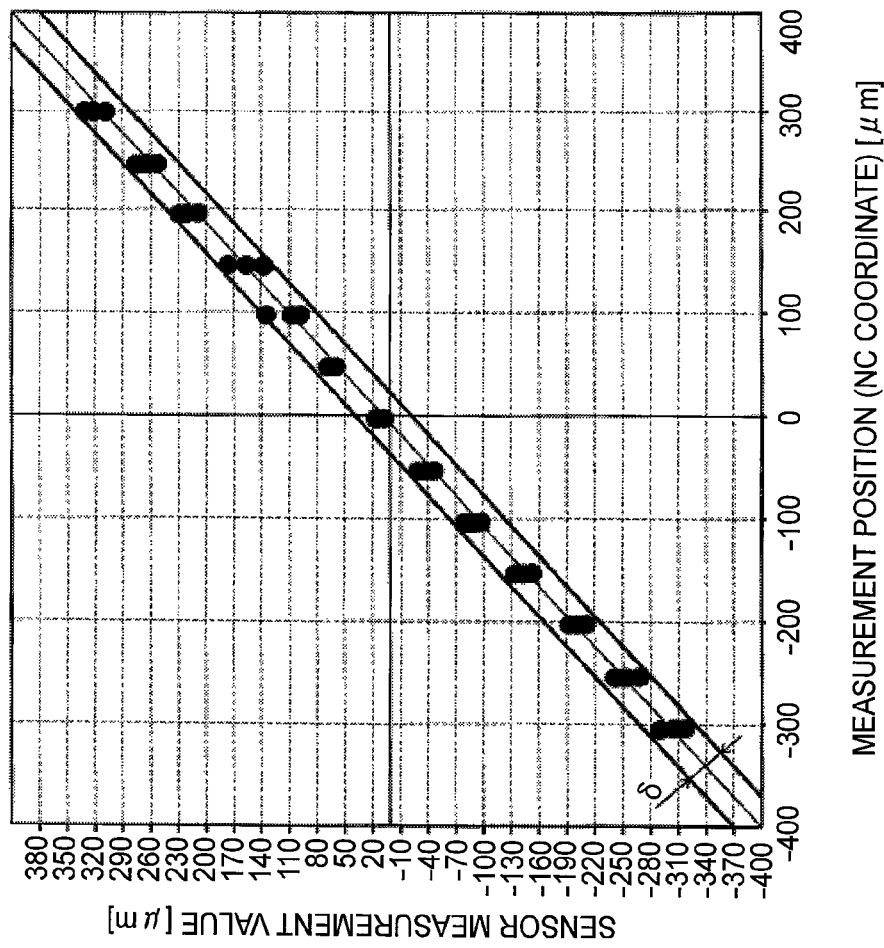
FIG. 16 is a view showing an evaluation result about a detection error of a butt position in a case shown in FIGS. 6 and 7.
Figure 17:
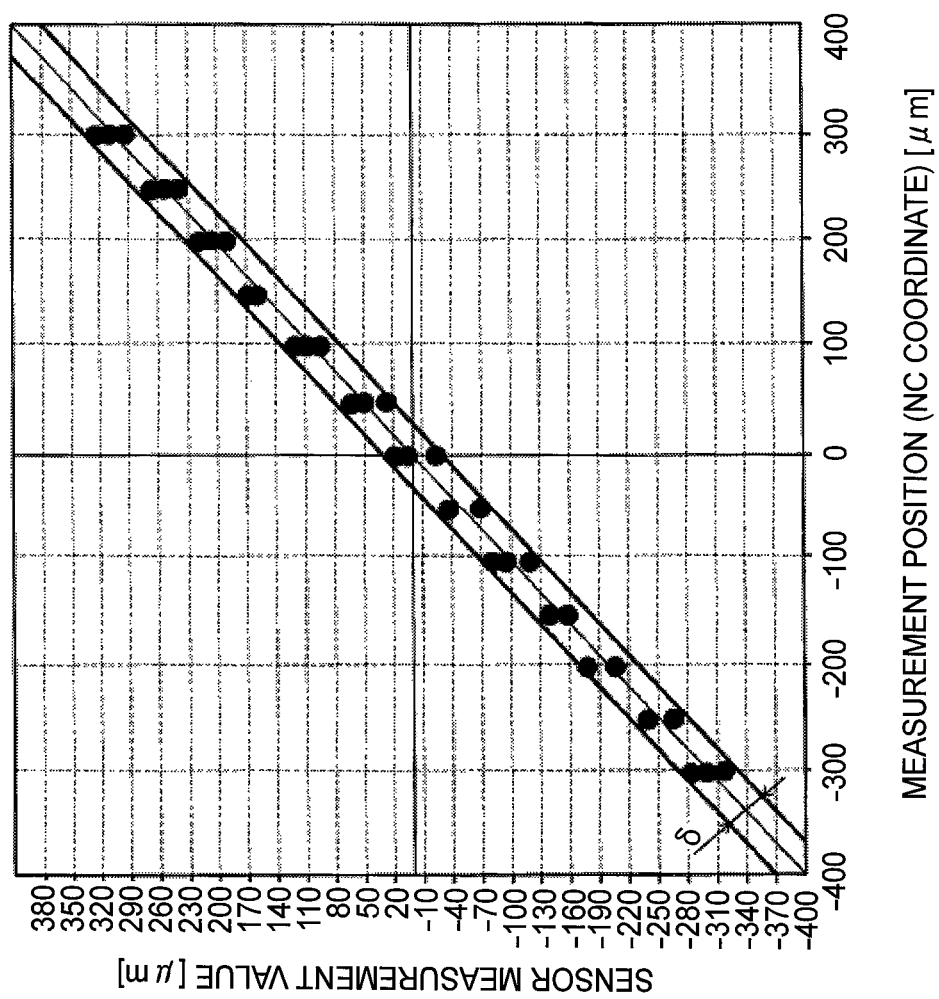
FIG. 17 is a view showing an evaluation result about a detection error of a butt position in a case shown in FIG. 8.

On the other hand, as in this embodiment of the invention, in the case where the sensor head 30 was arranged inclined at the sensor angle θs with respect to the weld line L as shown in the aforementioned FIGS. 7 and 8, all the detection errors in the sensor measurement value were confined within the provisional target error range δ as shown in FIGS. 16 and 17. This is considered to result from the fact that, due to the inclined arrangement of the sensor head 30 at the sensor angle θs with respect to the weld line L, light of the slit laser 42 that has been scattered or randomly reflected at the chamfer portion 44 of the differential case 20 is reflected toward the chamfer portion 46 side of the ring gear 22 and is unlikely to be received by the light receiving portion 40 of the sensor head 30, and that a clear two-dimensional cross-sectional profile can be measured by the sensor head 30.

To summarize the foregoing evaluation results on the detection error of the butt position, the average of the detection errors was 210.4 μm in the case where the optical axis C of the slit laser 42 of the sensor head 30 was arranged parallel to the weld line L as shown in FIGS. 10, 12 and 14. On the other hand, in the case where the sensor head 30 was arranged inclined at the angle θs with respect to the weld line L as shown in FIGS. 7 and 8 as in this embodiment of the invention, the average of the detection errors was 49.5 μm, which was smaller than ¼ of the value in the case where the optical axis C of the slit laser 42 of the sensor head 30 was arranged parallel to the weld line L. As described hitherto, according to this embodiment of the invention, the accuracy in detecting the position of the butt portion 24 of the differential case 20 and the ring gear 22 is enhanced.

Incidentally, in this embodiment of the invention, the example in which the butt position of the weld joint that is constituted of the differential case 20 and the ring gear 22 is detected has been described, but the invention is not limited thereto, but is also applicable to examples in which the butt positions of other weld joints are detected. For example, the invention is also applicable to a weld joint that is configured by butting shaft-shaped members against each other.

Effects of this Embodiment

According to this embodiment of the invention, the sensor head 30 is arranged at the position offset from the butt portion 24 toward the differential case 20 side in the Z-axis direction, and is arranged inclined at the angle θs with respect to the X-axis direction. Then, this angle θs is set smaller than the angle θa that is formed by the formation direction of the chamfer portion 44 of the differential case 20 with the X-axis direction. Thus, scattered light and randomly reflected light of the slit laser 42 at the chamfer portion 44 of the differential case 20 are reflected to the ring gear 22 side, and is unlikely to be received by the light receiving portion 40 of the sensor head 30. In this manner, the influence of scattered light and randomly reflected light of the slit laser 42 at the chamfer portion 44 of the differential case 20 on the light receiving portion 40 of the sensor head 30 can be eliminated with a simple mechanism, and a clear two-dimensional cross-sectional profile can be measured by the sensor head 30. Accordingly, while reducing costs, the position of the butt portion 24, which is formed by butting the joint surface 45 of the differential case 20 and the joint surface 47 of the ring gear 22 against each other, can be detected with high accuracy on the basis of this two-dimensional cross-sectional profile. Besides, the time needed to detect the position of the butt portion 24 can be shortened, and the time needed to perform a welding process can be shortened.

Besides, the position of the butt portion 24 can be detected without depending on the thicknesses, shapes and the like of the differential case 20 and the ring gear 22. Therefore, the degree of freedom in designing the differential case 20 and the ring gear 22 is enhanced.

Besides, by using the sensor head 30 that is integrally equipped with the light emitting portion 38 and the light receiving portion 40, the sensor for detecting the position of the butt portion 24 can be simplified in structure and reduced in size. Then, the light emitting portion 38 and the light receiving portion 40 can be arranged in a concentrated manner on the differential case 20 side with respect to the weld line L in the Z-axis direction as in this embodiment of the invention. Thus, the degree of freedom in designing the differential case 20 and the ring gear 22 is enhanced.

Besides, the corner portion 50 of the ring gear 22 is always exposed as viewed from the position where the sensor head 30 is arranged. Thus, the corner portion 50 of the ring gear 22 is always clearly apparent on the two-dimensional cross-sectional profile measured by the sensor head 30. Accordingly, the position of the corner portion 50 of the ring gear 22 is easily specified on this two-dimensional cross-sectional profile, and the position of the butt portion 24 that is formed by butting the joint surface 45 of the differential case 20 and the joint surface 47 of the ring gear 22 against each other can be more reliably detected with high accuracy.

Besides, the lower-limit of the dimension B that indicates the position of the corner portion 50 of the ring gear 22 is set equal to or larger than the upper-limit of the dimension A that indicates the position of the corner portion 48 of the differential case 20. Thus, the positional relationship between the corner portion 48 of the differential case 20 and the corner portion 50 of the ring gear 22 can be managed since the stage of designing the differential case 20 and the ring gear 22. Thus, the corner portion 50 of the ring gear 22 can be reliably set in such a manner as to be exposed as viewed from the position where the sensor head 30 is arranged. Accordingly, the position of the butt portion 24, which is formed by butting the joint surface 45 of the differential case 20 and the joint surface 47 of the ring gear 22 against each other, can be more reliably detected with high accuracy.

Besides, the position of the weld head 10 is corrected on the basis of the detection result of the position of the butt portion 24 of the differential case 20 and the ring gear 22. Therefore, the weld joint that is constituted of the differential case 20 and the ring gear 22 with enhanced weld quality can be manufactured.

Incidentally, the foregoing embodiment of the invention is nothing more than an exemplification, and is not intended to limit the invention at all. As a matter of course, the foregoing embodiment of the invention can be improved and modified in various manners without departing from the gist thereof.

DESCRIPTION OF REFERENCE SYMBOLS

1 . . . MANUFACTURING SYSTEM
10 . . . WELD HEAD
12 . . . Z-AXIS DRIVE MOTOR
18 . . . POSITION DETECTING DEVICE
20 . . . DIFFERENTIAL CASE
22 . . . RING GEAR
24 . . . BUTT PORTION
30 . . . SENSOR HEAD
32 . . . CONTROLLER
34 . . . PLC
36 . . . EXTERNAL OUTPUT INTERFACE
38 . . . LIGHT EMITTING PORTION
40 . . . LIGHT RECEIVING PORTION
42 . . . SLIT LASER
44 . . . CHAMFER PORTION (OF DIFFERENTIAL CASE)
45 . . . JOINT SURFACE (OF DIFFERENTIAL CASE)
46 . . . CHAMFER PORTION (OF RING GEAR)
47 . . . JOINT SURFACE (OF RING GEAR)
48 . . . CORNER PORTION (OF DIFFERENTIAL CASE)
50 . . . CORNER PORTION (OF RING GEAR)

A ... DIMENSION
B ... DIMENSION
C ... OPTICAL AXIS
L ... WELD LINE
θs ... SENSOR ANGLE
θa ... CHAMFER ANGLE (OF DIFFERENTIAL CASE)
θb ... CHAMFER ANGLE (OF RING GEAR)

The invention claimed is:

1. A butt position detecting method for a weld joint comprising detecting a position of a butt portion, which is formed by butting a joint surface of a first member and a joint surface of a second member against each other, by irradiating the butt portion with irradiation light of a two-dimensional displacement sensor having a light emitting portion and a light receiving portion, wherein:
when an arrangement direction of the first member and the second member is defined as a first direction, and a direction which is perpendicular to the first direction and in which the two-dimensional displacement sensor and the first member are arranged is defined as a second direction,
the first member has a corner portion that is formed at an end of the joint surface of the first member in the second direction, and a chamfer portion that forms the corner portion in a boundary region with the joint surface of the first member;
the second member has a corner portion that is formed at an end of the joint surface of the second member in the second direction, and a chamfer portion that forms the corner portion in a boundary region with the joint surface of the second member;
the corner portion of the second member is arranged at a position that is located outside the corner portion of the first member with respect to the second direction; and
the two-dimensional displacement sensor is arranged at a position offset from the butt portion toward a first member side in the first direction such that the chamfer portion of the second member, the corner portion of the second member, and the joint surface of the second member are irradiated with the irradiation light, and such that an angle θs at which the second direction and an optical axis direction of the irradiation light intersect with each other and an angle θa at which the second direction and a formation direction of the chamfer portion of the first member intersect with each other satisfy a condition expression: $0° < θs < θa$,
wherein the position of the butt portion is detected by specifying a position of the corner portion of the second member in a two-dimensional cross-sectional profile that is measured by the two-dimensional displacement sensor in a state where the light emitting portion and the light receiving portion are provided only on the first member side.

2. The butt position detecting method for the weld joint according to claim 1, wherein a lower-limit of a dimension that indicates a position of the corner portion of the second member in the second direction is set larger than an upper-limit of a dimension that indicates a position of the corner portion of the first member in the second direction.

3. The butt position detecting method for the weld joint according to claim 1, wherein the first member is a differential case, and the second member is a ring gear.

4. The butt position detecting method for the weld joint according to claim 1, wherein the light emitting portion emits the irradiation light and the light receiving portion receives a light reflected by the second member.

5. A butt position detecting device for a weld joint comprising:
a two-dimensional displacement sensor configured to irradiate a butt portion, which is formed by butting a joint surface of a first member and a joint surface of a second member against each other with irradiation light, the two-dimensional displacement sensor having a light emitting portion and a light receiving portion; and
a controller configured to detect a position of the butt portion, wherein:
when an arrangement direction of the first member and the second member is defined as a first direction, and a direction which is perpendicular to the first direction and in which the two-dimensional displacement sensor and the first member are arranged is defined as a second direction,
the first member has a corner portion that is formed at an end of the joint surface of the first member in the second direction, and a chamfer portion that forms the corner portion in a boundary region with the joint surface of the first member;
the second member has a corner portion that is formed at an end of the joint surface of the second member in the second direction, and a chamfer portion that forms the corner portion in a boundary region with the joint surface of the second member,
the corner portion of the second member is arranged at a position that is located outside the corner portion of the first member with respect to the second direction; and
the two-dimensional displacement sensor is arranged at a position offset from the butt portion toward a first member side in the first direction such that the chamfer portion of the second member, the corner a first member side portion of the second member, and the joint surface of the second member are irradiated with the irradiation light, and such that an angle θs at which the second direction and an optical axis direction of the irradiation light intersect with each other and an angle θa at which the second direction and a formation direction of the chamfer portion of the first member intersect with each other satisfy a condition expression: $0° < θs < θa$,
wherein the position of the butt portion is detected by specifying a position of the corner portion of the second member in a two-dimensional cross-sectional profile that is measured by the two-dimensional displacement sensor in a state where the light emitting portion and the light receiving portion are provided only on the first member side.

6. The butt position detecting device of claim 5, wherein the light emitting portion emits the irradiation light and the light receiving portion receives a light reflected by the second member.

7. A manufacturing method for a weld joint in which a first member and a second member are joined through welding of a butt portion, which is formed by butting a joint surface of the first member and a joint surface of the second member against each other, performed by a welding equipment, the method comprising:
irradiating the butt portion with irradiation light of a two-dimensional sensor to detect a position of the butt portion, the two-dimensional sensor having a light emitting portion and a light receiving portion, wherein:
when an arrangement direction of the first member and the second member is defined as a first direction, and a direction which is perpendicular to the first direction and in which the two-dimensional displacement sensor and the first member are arranged is defined as a second direction, the first member has a corner portion that is formed at an end of the joint surface of the first member in the second direction, and a chamfer portion that forms the corner portion in a boundary region with the joint surface of the first member;

the second member has a corner portion that is formed at an end of the joint surface of the second member in the second direction, and a chamfer portion that forms the corner portion in a boundary region with the joint surface of the second member;

the corner portion of the second member is arranged at a position that is located outside the corner portion of the first member with respect to the second direction; and the two-dimensional displacement sensor is arranged at a position offset from the butt portion toward the first member side in the first direction such that the chamfer portion of the second member, the corner portion of the second member, and the joint surface of the second member are irradiated with irradiation light of the two-dimensional displacement sensor, and such that an angle $\theta s$ at which the second direction and an optical axis direction of irradiation light intersect with each other and an angle $\theta a$ at which the second direction and a formation direction of the chamfer portion of the first member intersect with each other satisfy a condition expression: $0°<\theta s<\theta a$, correcting a position of the welding equipment on a basis of a detection result of the position of the butt portion; and joining the first member and the second member through welding of the butt portion performed by the welding equipment, wherein the position of the butt portion is detected by specifying a position of the corner portion of the second member in a two-dimensional cross-sectional profile that is measured by the two-dimensional displacement sensor in a state where the light emitting portion and the light receiving portion are provided only on the first member side.

8. The manufacturing method of claim 7, wherein the light emitting portion emits the irradiation light and the light receiving portion receives a light reflected by the second member.

* * * * *